J. C. CLANCY.
TREATMENT OF PRECIOUS METALLIFEROUS ORES.
APPLICATION FILED MAY 13, 1910.
976,045.
Patented Nov. 15, 1910.
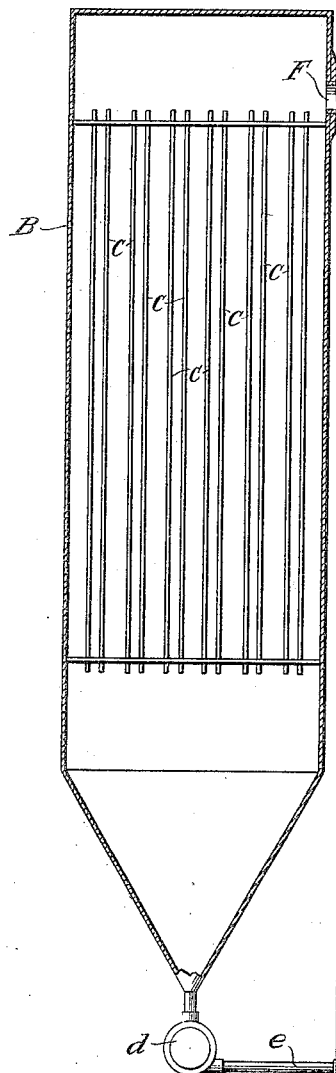
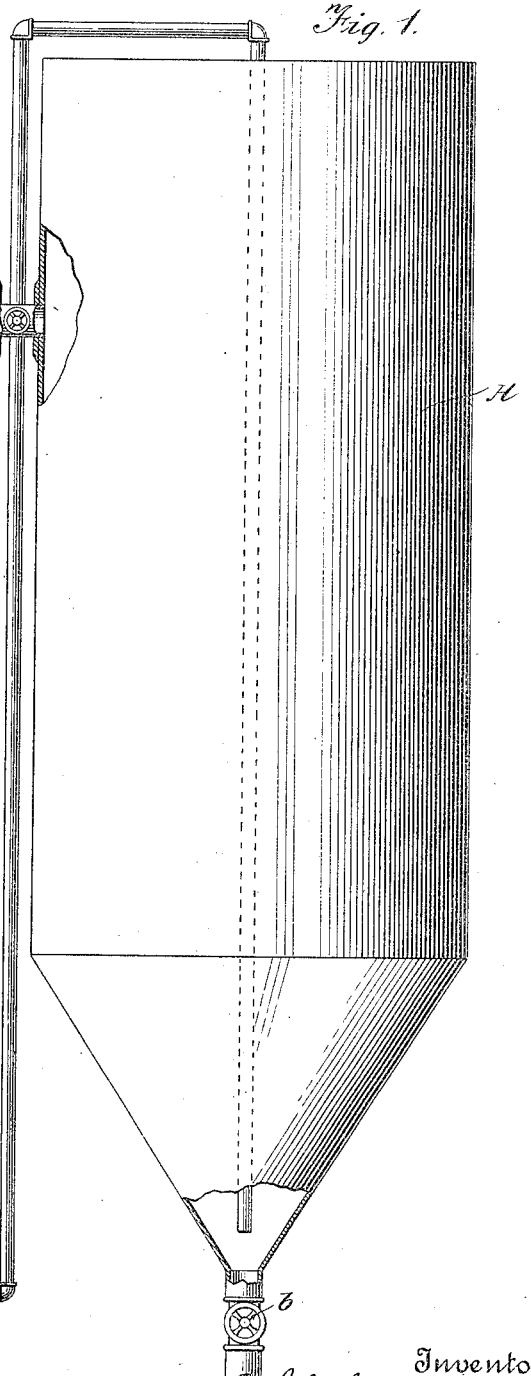

UNITED STATES PATENT OFFICE.

JOHN COLLINS CLANCY, OF NEW YORK, N. Y.

TREATMENT OF PRECIOUS METALLIFEROUS ORES.

976,045.     Specification of Letters Patent.     Patented Nov. 15, 1910.

Application filed May 13, 1910. Serial No. 561,154.

*To all whom it may concern:*

Be it known that I, JOHN COLLINS CLANCY, a subject of the King of Great Britain, having declared my intention of becoming a citizen of the United States, at present residing at New York city, borough of Manhattan, in the county of New York and State of New York, have invented certain new and useful Improvements in the Treatment of Precious Metalliferous Ores, of which the following is a specification.

I have discovered that a cyanogen-bearing compound which is not a solvent of the precious metals can be made a solvent of the same by the addition of an amidin or amid compound in the presence of an electric current. As the result of this discovery I am able to use cyanogen compounds heretofore not available in the cyanid process and also I am able to regenerate spent cyanid solutions and I am also able to use in the cyanid process oxidizing agents without loss of available cyanid.

In the practice of my invention I may use the crude cyanamid of commerce, its isomerids and polymerids, as a solvent for the precious metals and other metals contained in ores; or I may use a soluble cyanamid in conjunction with the cyanid process in the treatment of ores, and as a means of regenerating cyanid solution or non-available cyanogen-bearing solutions.

When a soluble amidin or amid compound (such for example, as dicyandiamidin, urea, guanidin, guanidy-guanidin, guanidin carbonate, formamid, oxamid, cyanamid, dicyanamid, or the various polymeric and isomeric modifications of the last-mentioned compounds) is added to a cyanogen-bearing solution and the mixture electrolyzed in contact with ore, the consumption of cyanid is very strikingly reduced; and also solutions containing cyanates, before, after or during the treatment of ore (together with ferrocyanids, ferricyanids, thiocyanates, or other such non-available cyanogen compounds formed in the treatment of ores) may be converted into compounds which readily dissolve the precious metals contained in ores; and most remarkable is the regeneration of cyanid from cyanates, such as alkaline cyanates, isocyanates and the various isomeric and polymeric compounds, or the oxygen derivatives of cyanogen, their isomerids and polymerids.

I have described the addition of a soluble amidin or amid compound, which may also include any of the above-mentioned compounds; but I use preferably, when working my process, a soluble cyanamid (such, for example, as calcium cyanamid, as it is at present the cheapest source of an amadin or amid compound). A solution of calcium cyanamid, or its isomerids and polymerids, when subjected to electrolysis, is, I have discovered, capable of dissolving the precious metals, and other metals, without any other admixture of cyanogen-bearing material. From cyanamid all the amid or amidogen compounds I have mentioned are very easily prepared. For instance: by the action of sulfuric acid or hydrochloric acid upon cyanamid, water is absorbed and it becomes urea. $H_2S$ converts it into thio-urea. $NH_3$ converts it into guanidin; while substituted guanidins are produced upon introducing the hydrochlorids or primary amins; and numerous other amid compounds may be prepared by simple inexpensive chemical treatment of cyanamid. It will, therefore, be obvious that my claim for a soluble amidin or amid compound includes all the polymeric and isomeric modifications and transpositions of soluble cyanamids. To show the action of these amid compounds, I may take, for example, urea (carbamid) and add this to a solution of a cyanate (such, for example, potassium cyanate) and electrolyze this mixture between inert electrodes. After a few minutes the said mixture will be transformed into one which will dissolve the precious metal in alkalin solution. It is well known that cyanates have absolutely no dissolving effect upon the precious metals, and that the formation of cyanate in the cyanid solution represents the chief source of loss of cyanid in the cyanid process, since when cyanates are allowed to stand for any considerable time, or are retained in solution, they are converted into ammonia, and potassium carbonates and are transposed by the lime used in the cyanid process into insoluble carbonates—or by the action of sulfuric acid in the ore into sulfates—so that the original cyanid finds itself eventually in the residue dumps in the form of calcium sulfates or insoluble carbonates. Any oxidation means, when used in the cyanid solution to hasten the dissolution of the precious metals, increases the cyanid consumption, due to the formation of cyanate, which is often very great; and up to the present, no means for regeneration or recovery of cyanid from cyanate in aqueous solutions has ever been discovered, so far as I am aware; but by my discovery that a soluble amidin or amid compound (such, for example, as calcium cyanamid) added to the cyanid-bearing solution, in conjunction with the electrolysis of said solution, opens up a cheap way whereby oxidation means other than atmospheric oxygen (such as treatment of cyanid-bearing solutions with oxidizing agents and soluble halogen compounds, or other oxidation means) may be successfully employed for readily dissolving and extracting precious metals from refractory ores— such as tellurids, arsenids, sulfids and other ores containing reducing agents. In general, this process may be successfully applied to either rebellious or non-rebellious ores without preliminary roasting, even though such ores contain the refractory compounds mentioned.

In the accompanying drawings Figure 1 is a vertical section of one form of apparatus adapted for carrying my invention into effect and Fig. 2 is a plan of the same.

A represents a round steel agitator tank provided with discharge valve b. B represents a round tank, termed the electrolyzer of smaller diameter provided with electrodes C. C. C. C. C. C.

d represents a pump for circulating the solutions through pipe e into the bottom of tank A.

F represents overflow pipe from tank A into the electrolyzer tank B.

I prefer to arrange the electrodes in the tank B rather than have the electrodes in the agitating tank, as by this arrangement no coarse sand is allowed to come in contact with the electrodes, which would happen if they were placed in the agitating tank. Another advantage is that the electrodes can be placed much closer together so as to decrease the resistance of the solution.

Different ores require variations in the composition of the solution and in the current. For example, in treating ores containing tellurids or arsenids, I may add a soluble halogen compound to the cyanamid treatment solution, or to the cyanogen-bearing solution, or to the non-available cyanogen-bearing solution, in the manner shown in the examples following. I have already described the function of a halogen compound (such as potassium iodid) in the cyanid solution in conjunction with an oxidizing agent in my Patent No. 955,318, dated April 19, 1910; and in any of the examples given, when the said halogen compound is used, the function is analogous.

In the following examples I use a solution of a soluble cyanamid alone, or in conjunction with the cyanid solution, or in conjunction with a non-available cyanogen-bearing solution. By non-available cyanogen-bearing solution I mean one that contains cyanogen in a different combination from that in which it exists in what is known as simple alkalin cyanids. For example, a solution after being used in the treatment or ore on testing shows no available cyanid. The cyanid in such solution is said to have been consumed, and is unfit for further treatment of ore until restrengthened by the addition of more cyanid. It is clear, therefore, that my process aims at, besides its other features mentioned, the substitution of a cheap amidin or amid compound (such, for example, as calcium cyanamid) in the place of cyanid or together with only a small proportion of cyanid.

Example 1: 2000 lbs. of pulverized ore is suspended in a solution of 4 lbs. calcium cyanamid, 2 lbs. caustic soda or lime (with or without the addition of 1 lb. potassium iodid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About from 90 to 120 amperes are used per ton of ore.

Example 2: 2000 lbs. of pulverized ore is suspended in a solution of 1 lb. of potassium cyanid, 2 lbs. calcium cyanamid, 2 lbs. caustic soda, or lime (with or without the addition of 1 lb. potassium iodid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About 90 to 120 amperes are used per ton of ore.

Example 3: 2000 lbs. of pulverized ore is suspended in a solution of 2 lbs. potassium ferrocyanid, 2 lbs. calcium cyanamid, 2 lbs. caustic soda or lime (with or without the addition of 1 lb. potassium iodid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About 90 to 120 amperes are used per ton of ore.

Example 4: 2000 lbs. of pulverized ore is suspended in a solution of 2 lbs. potassium thiocyanate, 2 lbs. calcium cyanamid, 5 lbs. pulverized calcium carbonate (with or without the addition of 1 lb. potassium iodid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About from 90 to 120 amperes are used per ton of ore.

Example 5: 2000 lbs. of pulverized ore is suspended in a solution of 1 lb. potassium cyanid, 2 lbs. calcium cyanamid, 10 lbs. pulverized calcium carbonate (with or without the addition of 1 lb. potassium iodid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About from 90 to 120 amperes are used per ton of ore.

Example 6: 2000 lbs. of pulverized ore is suspended in a solution of 1 lb. potassium cyanid, 1 lb. potassium thiocyanate, 1 lb. calcium cyanamid, 10 lbs. calcium carbonate (with or without the addition of 1 lb. potassium bromid) in 2000 lbs. of water. The whole mixture, being in the proportion of two parts of said solution to one part of ore, is contained in an agitation tank. This mixture of ore and solution is continuously circulated for a period of twelve hours through the electrolyzer having a current density of about 50 amperes per square foot of electrode surface. About from 90 to 120 amperes are used per ton of ore.

In this specification I have described my meaning of a non-available cyanogen-bearing solution, and I now give the following example as being a typical one for the regeneration of cyanid from spent cyanid solutions—that is, those solutions in which the cyanogen is non-available, such, for example, as cyanates, ferrocyanids, ferricyanids, sulfocyanids, etc.

Example: Take 2000 lbs. of solution which had an original strength of 2 lbs. cyanid per ton and which has already been used for the treatment of ore, on testing shows only ¼ lb. of cyanid per ton of solution. Add 4 lbs. of calcium cyanamid and electrolyze this mixture between inert electrodes for a period of two hours at a current density of 50 amperes per square foot of electrode surface. On again testing the said solution it will be found that the available cyanid is increased, or rather gives a titration equal to 2 lbs. of available cyanid. This solution is then ready for treating a fresh batch of ore. From the above it will be seen that ores which are readily leachable may be treated by percolation with the above described electrolyzed solution.

It will be seen that by my invention I generate solvents and continuously dissolve the precious metals which transforms them into compounds soluble in the above solutions. The function of the electric current in conjunction with a soluble amidin or amid compound (such, for example, calcium cyanamid in the cyanogen-bearing solution) is one that is both reducing and oxidizing. It is clear that I make use of the anodic and cathodic reactions which occur at both electrodes in my solutions.

From the above solutions or pulp the dissolved metals may easily be recovered by filtration and precipitation by methods well known and in use.

Having thus described my invention and examples of different ways of carrying it into effect, it will be understood that various modifications and changes in the described processes may be made and equivalent substances may be employed without departing from the spirit of my invention and without exceeding the scope of my claims.

It may be mentioned that the addition of a salt such as, for example, sodium sulfate, or ammonium sulfate may be added to the solutions to render the same more conductive. In practice I find the addition of from 10 to 20 pounds of either of the above salts to a ton of solution gives satisfactory results.

What I claim and desire to secure by Letters Patent of the United States is:—

1. The process of treating ore containing precious metals which consists in subjecting said ore to the action of a solution containing a cyanogen-bearing material and an amidin or amid compound and electrolyzing said solution or mixture.

2. The process of treating ore containing precious metals which consists in subjecting said ore to the action of a solution containing a cyanamid, and electrolyzing the said solution or mixture.

3. The process of treating ore containing precious metals which consists in subjecting said ore to the action of a solution containing a cyanamid in the presence of a halogen compound and electrolyzing said solution or mixture.

4. The process of treating ore containing precious metals which consists in subjecting said ore to the action of a cyanogen-bearing solution containing a cyanamid and electrolyzing said solution or mixture.

5. The process of treating ore containing precious metals which consists in subjecting said ore to the action of a cyanogen-bearing solution containing a soluble cyanamid and a halogen compound and electrolyzing said solution or mixture.

6. The process of treating ore containing precious metal which consists in subjecting said ore to the action of a cyanogen bearing solution and regenerating said solution by subjecting it to the action of a soluble amidin or amid compound, and electrolyzing the mixture.

7. The process of treating ore containing precious metal which consists in subjecting said ore to the action of a cyanogen bearing solution and regenerating said solution by subjecting the same to the action of calcium cyanamid and electrolyzing the mixture.

In testimony whereof I have hereunto signed my name in the presence of two subscribing witnesses.

JOHN COLLINS CLANCY.

Witnesses:
M. E. McNINCH,
C. E. HEYLMUR.